United States Patent [19]
Vogel et al.

[11] Patent Number: 6,136,194
[45] Date of Patent: *Oct. 24, 2000

[54] METHOD AND DEVICE FOR TREATING WASTEWATER

[75] Inventors: Steven M. Vogel, Minnetonka; Surya R. Pidaparti, Eagan, both of Minn.

[73] Assignee: The Lemna Corporation, Minneapolis, Minn.

[ * ] Notice: This patent is subject to a terminal disclaimer.

[21] Appl. No.: 09/233,604

[22] Filed: Jan. 19, 1999

Related U.S. Application Data

[63] Continuation-in-part of application No. 08/833,603, Apr. 9, 1997, Pat. No. 5,861,095.

[51] Int. Cl.$^7$ .................................................. C02F 3/30
[52] U.S. Cl. ........................ 210/605; 210/615; 210/621; 210/630; 210/150; 210/195.1; 210/903
[58] Field of Search .................................. 210/605, 675, 210/616, 620, 621, 622, 629, 630, 150, 151, 195.1, 202, 219, 220, 259, 903

[56] References Cited

U.S. PATENT DOCUMENTS

| | | | |
|---|---|---|---|
| 3,234,123 | 2/1966 | Hinde | 210/605 |
| 3,701,727 | 10/1972 | Kormnnik | 210/605 |
| 4,201,663 | 5/1980 | Rollag et al. | 210/16 |
| 4,209,388 | 6/1980 | De Fraites | 210/8 |
| 4,479,876 | 10/1984 | Fuchs | 210/605 |
| 4,826,601 | 5/1989 | Spratt | 210/610 |
| 4,838,043 | 6/1989 | Jenks | 66/170 |
| 4,867,883 | 9/1989 | Daigger et al. | 210/630 |
| 4,917,805 | 4/1990 | Reid | 210/630 |
| 4,977,759 | 12/1990 | Jencks | 66/81 |
| 5,096,577 | 3/1992 | Ngo et al. | 210/151 |
| 5,196,111 | 3/1993 | Nicol et al. | 210/605 |
| 5,256,281 | 10/1993 | Ngo et al. | 210/151 |
| 5,338,452 | 8/1994 | Pidaparti | 210/603 |
| 5,342,522 | 8/1994 | Marsman et al. | 210/605 |
| 5,400,549 | 3/1995 | Morgan | 52/23 |
| 5,421,999 | 6/1995 | Poole et al. | 210/150 |
| 5,534,141 | 7/1996 | McAnaney et al. | 210/110 |
| 5,736,047 | 4/1998 | Ngo | 210/602 |
| 5,771,716 | 6/1998 | Schussel | 66/195 |

FOREIGN PATENT DOCUMENTS 2540284  3/1977  Germany .

OTHER PUBLICATIONS

Lemna Corporation "Floating Modular Cover Systems" Brochure, Apr. 1997.

Lemna Corporation "If You Think Natural Treatment Systems are Limited In Scope . . . It's Time to Look at a Lemna System" Brochure, 1992.

"Melbourne Water's Wastewater Treatment Lagoons: Design Modifications to Reduce Odours and Enhance Nutrient Removal", by Hodgson et al., vol. 33, No. 7, pp 157–164, Mar. 1995.

*Primary Examiner*—Christopher Upton
*Attorney, Agent, or Firm*—Kinney & Lange, P.A.

[57] ABSTRACT

A wastewater treatment system substantially reduces wastewater treatment time and increases treatment capacity. The system includes at least one completely covered aerobic reactor cell and a completely covered quiescent anaerobic reactor cell. The system can also include a polishing reactor for further treating wastewater after treatment by the anaerobic reactor cell. The covered aerobic reactor cell preferably includes a pair of subcells in which a first cell includes continuous mixing and aeration of the wastewater and the second cell includes only intermittent mixing and aeration of the treated wastewater. The system optionally includes a completely covered anoxic reactor cell for treating wastewater prior to treatment by the completely covered aerobic reactor cell. The anoxic reactor cell receives partially treated wastewater recirculated from the polishing reactor. Growth media can be used in the reactor cells to enhance biological activity. The system can be used to retrofit a preexisting wastewater treatment facility.

30 Claims, 7 Drawing Sheets

METHOD AND DEVICE FOR TREATING WASTEWATER

This application is a continuation-in-part of application Ser. No. 08/833,603, filed Apr. 9, 1997, which issued as U.S. Pat. No. 5,861,095 on Jan. 19, 1999.

BACKGROUND OF THE INVENTION

The present invention relates to wastewater treatment systems and in particular to a covered lagoon based wastewater treatment system. A lagoon is any earthen basin for containing a body of water.

Conventional lagoon based wastewater treatment systems rely on open air lagoons to permit aerobic and anaerobic treatment of wastewater. A lagoon is any earthen basin for containing a body of water, such as a treatment reactor cell. Lagoon based systems require a large amount of space, on the order of several acres. Once the treatment capacity for a lagoon based system is reached, additional capacity can only be accomplished by building additional lagoons, which requires a significant capital expenditure and the use of more land. In addition, traditional lagoon based systems cannot achieve more stringent effluent limits required by recent environmental regulation changes without farther increasing the treatment time or without adding costly mechanical adaptations. Neither of these options are desirable.

Traditional lagoon based systems have several shortcomings. Open air ponds produce odors and permit algae growth which inhibits wastewater treatment. In addition, open air ponds expose the treatment pond to ambient air conditions. In cold climates, this exposure significantly slows treatment and reduces the effectiveness of the treatment since biological activity of the bacteria are decreased. In particular, bacteria which remove ammonia nitrogen are significantly inhibited.

Finally, traditional lagoon based systems produce sludge that settles in all the basins requiring periodic shutdown of the treatment ponds to remove the sludge.

SUMMARY OF THE INVENTION

A wastewater treatment system of the present invention substantially reduces wastewater treatment time and increases treatment capacity. The system includes at least one completely covered aerobic reactor cell and a completely covered quiescent anaerobic reactor cell. The system can also include a polishing reactor for further treating wastewater after treatment by the anaerobic reactor cell. The covered aerobic reactor cell preferably includes a pair of subcells in which a first cell includes complete mix treatment including aeration (and optional mixing) of the wastewater and the second cell includes partial mix treatment including aeration and intermittent mixing of the partially treated wastewater.

This system dramatically reduces wastewater treatment times and increases system capacity through several effects. First, the cover eliminates algae production by blocking sunlight and reduces odor migration from the ponds. Second, the cover provides insulation from ambient air conditions (e.g. freezing temperatures) to permit the reactor cells to operate at higher temperatures year round. Higher water temperatures are conducive to heightened biological activity of the aerobic and anaerobic treatment bacteria. Third, the system permits increased treatment capacity (e.g., doubled capacity) without increasing the number or size of the treatment ponds. This latter feature is significant since an additional treatment pond need not be built to increase treatment capacity. Alternatively, if a new system is being constructed, a high capacity treatment system can be built on a smaller footprint than a conventional system. In other words, the system greatly reduces the pond footprint required to treat a given volume of wastewater. Fourth, by covering the process, the polishing reactor will reduce ammonia regardless of the ambient air temperature. Fifth, the combination of the covered aerobic mixing cells and covered anaerobic settling zone prevents solids build up in the aerobic cells through treatment and mixing, which keeps the remaining solids suspended, and more nearly balances a rate of growth and decay in the anaerobic zone thereby limiting sludge removal to a periodic operation in the anaerobic settling zone only. Finally, the polishing reactor insures reduction of biochemical oxygen demand (BOD), total suspended solids (TSS) and ammonia-nitrogen ($NH_3$—N) to meet the most stringent effluent limits.

While the above-identified drawing figures set forth preferred embodiments of the invention, other embodiments are also contemplated, as noted in the discussion. In all cases, this disclosure presents the present invention by way of representation and not limitation. It should be understood that numerous other modifications and embodiments can be devised by those skilled in the art which fall within the scope and spirit of the principles of this invention.

DETAILED DESCRIPTION OF THE PREFERRED EMBODIMENTS

Overview of Treatment System

Figure 1:
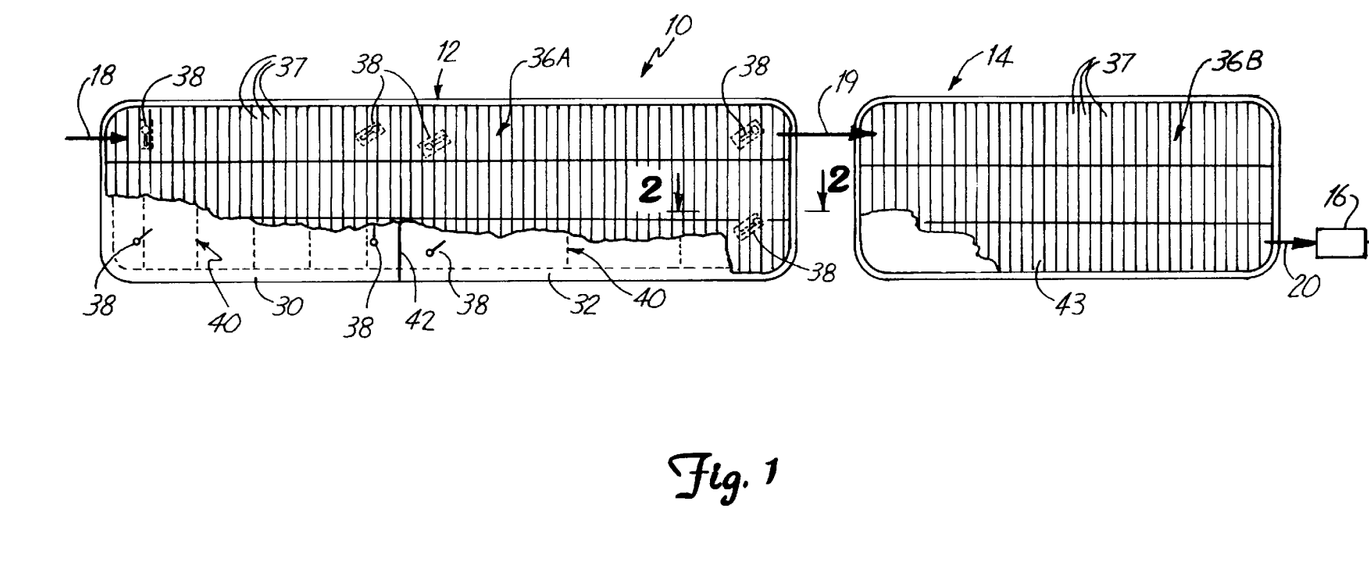
FIG. 1 is a plan view of a system of the present invention.

FIG. 1 shows a top plan view of a wastewater treatment system 10 of the present invention. System 10 includes first pond 12, second pond 14, polishing reactor 16, influent 18, intermediate effluent 19, and effluent 20. First pond 12 includes complete mix aerobic cell 30, partial mix aerobic cell 32, cover system 36A, mixers 38, air diffusion system 40, and hydraulic baffle 42. Second pond 14 defines quiescent anaerobic cell 43 and includes cover system 36B. Second pond 14 lacks mixers and lacks an air diffusion system. Sewage flows into the system 10 as influent 18, through first pond 12, second pond 14, and polishing reactor 16 and exits system 10 as effluent 20.

First pond 12 and second pond 14 include conventional inlet and out let regulators for controlling the flow rate of influent 18 and effluent 20 and intermediate effluent 19 between first pond 12 and second pond 14.

First pond 12 defines a reactor that aerobically treats wastewater received through influent 18. The wastewater to be treated generally contains carbonaceous COD and BOD, phosphorous, nitrogen and adsorbable pollutants. Bacteria within first pond 12 converts the dissolved organic waste material, phosphorous and nitrogen into stable by-products including carbon dioxide, nitrates, nitrites, water and biological solids (sludge) through processes of biological activity of the bacteria including biodegradation and nitrification.

Accordingly, both complete mix aerobic cell 30 and partial mix aerobic cell 32 includes mixers 38 and air diffusion system 40 (although cell 30 can operate without mixers 38). Mixers 38 comprise floating mechanical surface aerators to provided both mixing and aeration. Mixers 38 are secured in place by tether lines secured to a wall of first pond 12 and second pond 14, respectively. Mixers 38 are placed about complete mix aerobic cell 30 and partial mix aerobic cell 32 to permit a predetermined amount of mixing. The mixing equipment in partial mix aerobic cell 32 is operated intermittently to resuspend settled solids and assure their transport out of this cell.

Complete mix cell 30 and partial mix 32 are operated in the manner (i.e. speed of wastewater flow and/or amount of mixing) in which those skilled in the art use the terms complete mix and partial mix for lagoon based systems and as referenced by the EPA for such systems.

Air diffusion system 40 provides a grid of fine bubble diffused air aerators positioned primarily at the floor of first pond 12. Air diffusion system 40 provides compressed air to wastewater within first pond 12 to mix the wastewater and biological solids to maximize contact between the bacteria and the dissolved organics within the wastewater and aerates the wastewater to further maximize the reaction between the bacteria and organics.

Cover system 36A, 36B essentially includes a removable modular pond cover system as disclosed in Morgan U.S. Pat. No. 5,400,549, entitled INSULATED REMOVABLE POND COVER, which is hereby incorporated by reference. Cover system 36A, 36B includes a plurality of modules 37 arranged together to completely cover first pond 12 and second pond 14. Cover system 36A, 36B is capable of letting gases generated by first pond 12 and second treatment pond 14 escape to the atmosphere and is capable of permitting precipitation (e.g. rain) to pass through the cover system 36A, 36B so that water does not build up on top of cover system 36A,36B. Each module 37 includes a floating insulating component so that cover system 36A, 36B floats on top of the wastewater in ponds 12 and 14 while also insulating the water from atmospheric conditions such as cold air temperatures. This insulation facilitates aerobic and anaerobic treatment of wastewater since the biologic activity in the water is heightened at higher temperatures. The increased operating temperatures created by cover system 36A, 36B also permits year round nitrification regardless of ambient air temperatures. Cover system 36A, 36B also blocks exposure of the wastewater from the sun to prevent algae growth in pond 12 and pond 14. A more detailed illustration of modules 37 of system 36 is provided in FIG. 2.

Hydraulic baffle 42 extends transversely across first pond 12 to separate first pond 12 into complete mix aerobic cell 30 and partial mix aerobic 32. Baffle 42 is positioned to divide first pond 12 into two parts. Baffle 42 preferably comprises a non-porous fabric sheet connected to the sides of pond 12 and defines a flow passage substantially smaller than the transverse cross sectional area of first pond 12. Baffle 42 essentially permits gradual controlled flow of partially treated wastewater from cell 30 into cell 32.

Second treatment pond 14 defines a basin containing intermediate effluent 19 from first treatment pond 12 and defines quiescent anaerobic cell 43. Second pond 14 lacks mixers 38, air diffusion system 40, and baffle 42. However, second pond 14 does include cover system 36B which completely covers second pond 14, and which has a structure identical to cover system 36A that covers first treatment pond 12.

Anaerobic cell 43 of second treatment pond 14 defines a reactor which allows deposition of suspended solids and removal of dissolved organic matter when bacteria within cell 43 convert the dissolved organic waste material into carbon dioxide, methane, biological solids (sludge) in the absence of oxygen, nitrate or sulfates. This settling step permits a large amount of suspended solids to settle or precipitate out of the wastewater after the aerated treatment in first pond 12.

Polishing reactor 16 is disclosed in Poole et al. U.S. Pat. No. 5,421,999, entitled FLOATING NITRIFICATION REACTOR IN A TREATMENT POND, which is hereby incorporated by reference. The reactor consists of aerated submerged attached-growth media modules, which maintain an adequate population of bacteria for this treatment step. The reactor removes residual BOD from the preceding treatment step and provides nitrification.

Figure 2:
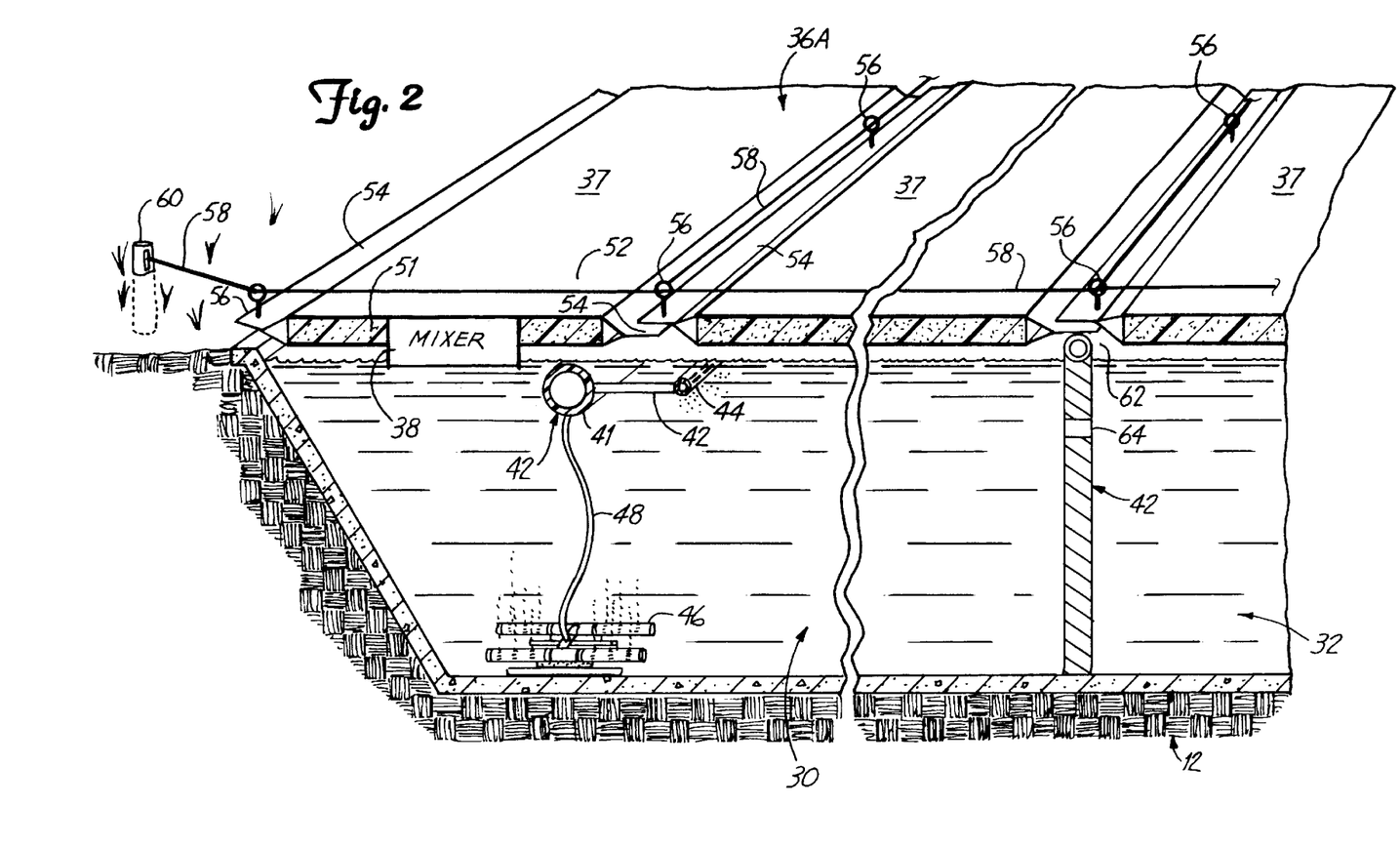
FIG. 2 is a sectional view of the system of FIG. 1 as taken along lines 2—2.

FIG. 2 is an enlarged cross sectional view of a portion of first pond 12 which further illustrates its previously described components including complete mix aerobic cell 30 and partial mix aerobic cell 32 shown on opposite sides of baffle 42. As seen in FIG. 2, cover system 36A includes cover modules 37, with each module 37 having floating insulation member 51, durable geomembrane casing 52 and edges 54. Cover system 36 further includes pins 56, cable 58 and anchor 60. Baffle 42 includes float 62 and port 64 for permitting a small continuous flow of partially treated wastewater from complete mix aerobic cell 30 to partial mix aerobic cell 32.

In addition, FIG. 2 shows previously discussed air diffusion system 40, which includes main air conduit 41, lateral air conduit 45, upper air diffuser unit 44 and lower air diffuser units 46, and air lines 48. For illustrative purposes, FIG. 2 only shows a single air conduit 41, single lateral air conduit 45, single upper air diffuser unit 44, and single lower air diffuser unit 46. However, first pond 12 includes an entire network or grid of upper and lower diffuser units 44 and 46 (fed by multiple main air conduits 41 and lateral conduits 45) arranged in both cells 30 and 32 of first pond 12 to provide fine bubble air diffusion throughout first pond 12. As shown in FIG. 1, a denser network of main air conduits 41 (and consequently, more air bubble diffusers) is provided in complete mix aerobic cell 30 than in partial mix aerobic cell 32 since partial mix aerobic cell 32 requires less aeration and mixing than cell 30.

As shown in FIG. 2, previously described cover module 37 of cover system 36A, 36B is defined by closed cell insulation member 51 sealed within a sheet casing 52 of durable geomembrane. Gases emitted by biological treatment activity escapes treatment pond 12 upward between edges 54 of adjacent modules 37, while rain/precipitation is permitted to pass downward through edges 54 between adjacent modules 37 into first pond 12. Cover system 36A and 36B permits odor containment since modules 37 completely cover pond. Insulation member 51 of modules 37 provide heat insulation since member 51 has insulation factor from R-8 up to R-25. Individual modules 37 also preferably include openings formed in select modules 37 to house floating mechanical equipment such as floating mixers 38 or other stationary mechanical equipment. Modules 37 can also includes hatches for access to submerged equipment or for sampling the wastewater. The buoyancy of the rigid cover system 36A, 36B is sufficient to support the weight of several crew members who may be walking or working on cover system 36A, 36B.

Polishing Reactor

Figure 3:
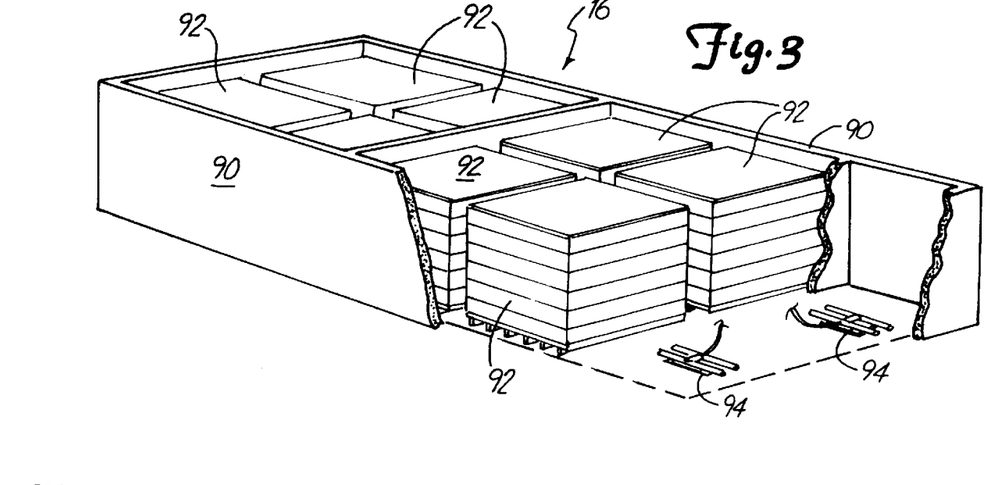
FIG. 3 is an enlarged perspective view of FIG. 1 with portions broken away.

FIG. 3 is an enlarged perspective view of previously described polishing reactor 16 with portions broken away for illustration. As shown in FIG. 3, polishing reactor 16 further includes housing 90, modules 92 and preaeration diffusers 94. Pre-aeration diffusers 94 consist of rack mounted coarse bubble diffusers located under the modules 92 which evenly distribute the air and shear coarse bubbles into very fine bubbles. This process raises the dissolved oxygen level in polishing reactor 16 to bring food and oxygen to the nitrifiers to allow a biomass attached to modules 92 to nitrify the ammonia. The polishing reactor 16 enhances the growth of nitrification bacteria to facilitate conversion of ammonia to nitrates and nitrites in an aerobic environment.

Each module 92 is comprised of plastic cross-flow media contained in a stainless steel support structure. One or more of the first modules 92 are intended for final BOD removal/polishing and are made from less dense trickling filter media and can absorb any concentration excursions without fouling. The remaining modules 92 in the polishing reactor 16 are made of a high density media and are intended for nitrification (i.e. ammonia-nitrogen ($NH_3$—N) polishing). The large surface area of the media allows for growth of a thin bacterial film capable of nitrification and BOD reduction.

Modules 92 and aeration diffusers 94 can be supported in the water column either by floats or leg supports. Individual modules 92 are isolated within separate cells within reactor 16 to provide efficiency and highest possible biological reaction rates. This individual module cell structure of two or more modules 92 increases effectiveness of the system by preventing dilution into the total volume of the reactor 16, thereby maintaining the highest food concentration possible.

The water column is insulated throughout first and second ponds 12 and 14, thereby permitting a higher temperature be maintained for allowing nitrification year round. Housing 90 is located near system effluent 20 and is a portion of second pond 14 that is isolated by a baffle (e.g. nonporous fabric baffle similar to baffle 42) from cell 43 or alternatively, is in a separate concrete, metal or plastic structure.

When used after wastewater treatment with appropriate detention times in complete mix aerobic cell 30, partial mix aerobic cell 32, and anaerobic cell 43 as described above, polishing reactor 16 is capable of achieving biochemical oxygen demand (BOD) less than 10 mg/l, total suspended solids (TSS) less than 10 mg/l, ammonia-nitrogen ($NH_3$—N) as low as 1 mg/l, and dissolved oxygen (D.O.) more than 6 mg/l.

When submerged attached growth media are deployed in one or more of the covered complete mix aerobic cell, partial mix aerobic cell and/or the quiescent anaerobic cell to achieve nitrification, the polishing reactor may not be necessary.

When nitrified effluent from one or more of the treatment steps is recirculated to reactor cells which contain submerged attached growth media, denitrification can be achieved by proper process control. These reactor cells include: the complete mix aerobic cell, partial mix aerobic cell and/or the quiescent anaerobic cell. Denitrification is the conversion of the products of nitrification (nitrates and nitrites) to molecular nitrogen which is usually released to the atmosphere as a free gas.

Denitrification can be accomplished (as is known to those skilled in the art) by limiting aeration while maintaining mixing in the vicinity of the submerged attached growth media.

Operation of System

As seen in FIG. 1, in operation, influent 18 enters covered complete mix aerobic cell 30 of first pond 12 and is subject to aerobic biodegradation and nitrification with aerobic bacteria. Aggressive and continuous mixing and aeration of wastewater in aerobic cell 30 is accomplished through mixers 38 and air diffusion system 40, which provide dissolved oxygen and mixing action to heighten biological activity in the wastewater. Wastewater is typically detained in complete mix aerobic cell 30 for about 3 days resulting in a reduction of biochemical oxygen demand (BOD) from 250 mg/L to 40 mg/L.

Accordingly after treatment in aerobic cell 30, partially treated wastewater migrates through baffle 42 (via port 64) from complete mix aerobic cell 30 to partial mix aerobic cell 32. The partially treated wastewater is subject to further diffused air injections and some mixing. In addition, wastewater in cell 32 is aggressively mixed on an intermittent basis (e.g. 10% of total detention time in cell 32) to re-suspend solids that have settled in cell 32. Since it is not desirable that solids accumulate in partial mix aerobic cell 32, this intermittent aggressive mixing ensures that the majority of solids will be transported to anaerobic treatment cell 43 in second pond 14. Wastewater is typically detained in partial mix aerobic cell 32 for about 4 days resulting in a reduction of biochemical oxygen demand (BOD) from 40 mg/L to 25 mg/L.

After treatment in partial mix aerobic cell 32, partially treated wastewater flows as intermediate effluent 19 into anaerobic cell 43 in second pond 14. Anaerobic cell 43 is a quiescent settling zone free of mixing, aeration, and agitation to permit solids to settle out of the wastewater. After aerobic treatment in aerobic cells 30 and 32, and after detention in anaerobic cell 43 for about 4 days, the total suspended solids (TSS) are reduced from 250 mg/L to about 15 mg/L. In addition, after detention for 4 days in anaerobic cell 43, BOD is reduced from 25 mg/L to about 20 mg/L.

Finally, partially treated wastewater from anaerobic cell 43 in second pond 14 flows into polishing reactor 16. Polishing reactor is an aerobic environment first configured to remove residual BOD from the prior treatment steps. As an example, polishing reactor 16 reduces BOD from 20 mg/L to about 15 mg/L. In addition, polishing reactor 16 includes modules 92 adapted to ensure nitrification of wastewater down to 1 mg/L $NH_3$—N.

This treatment level, particulary the nitrification of ammonia, can be accomplished regardless of ambient air temperatures, which would otherwise preclude treatments to these low effluent levels. Moreover, with this system, sludge production is reduced by 85% to 94% when compared to extended air activated sludge facilities. Accordingly, sludge need only be removed from anaerobic cell 43 on a periodic basis once every seven to eleven years.

The detention time in each cell may be the same or it may vary, dependent on such factors as, for example, cell size and the biological loadings of the cell, but a preferred detention time for each cell would be 3–6 days.

EXAMPLE 1

Retrofit of Conventional Pond System

Figure 4:
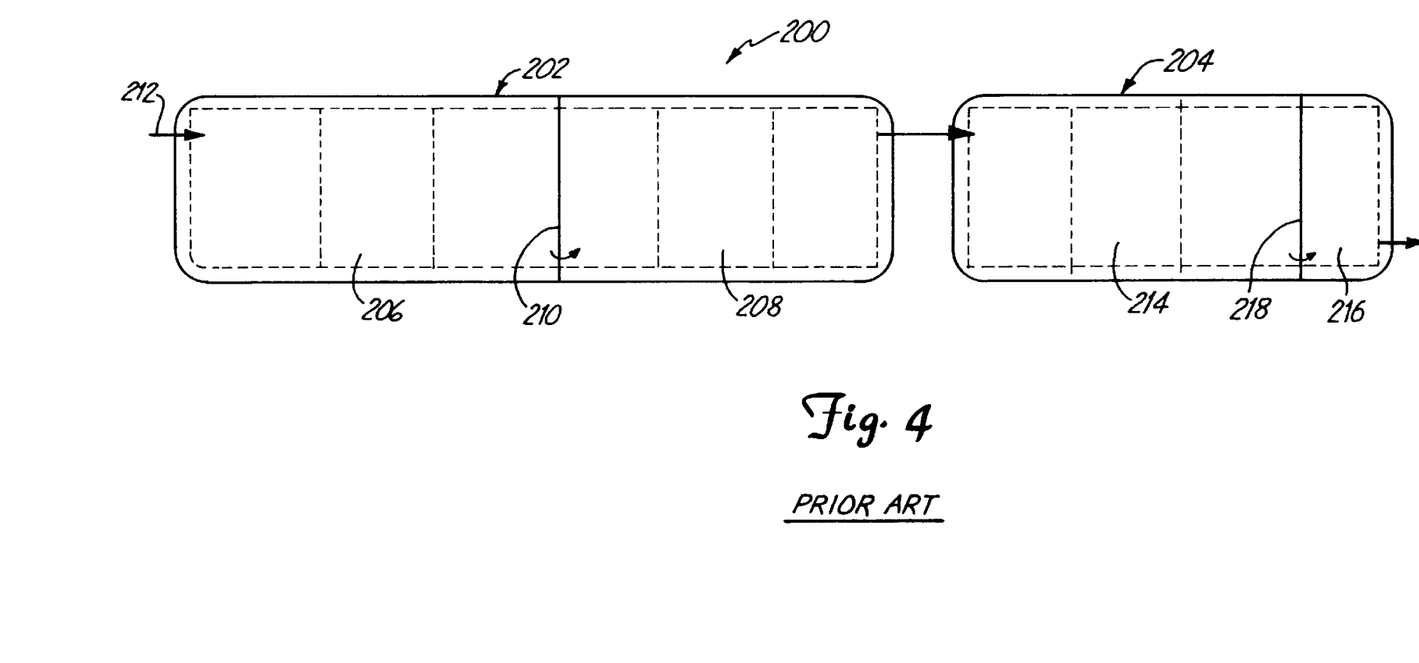
FIG. 4 is a plan view of a prior art conventional system prior to conversion to a system of the present invention.

An existing lagoon treatment facility has an aerating pond system as shown in FIG. 4. Conventional system 200 includes first pond 202 and second pond 204. First pond 202 is a conventional aerobic treatment cell including a first cell 206 and second cell 208. First pond 202 covers 1.1 acres, is 8 feet deep and is designed to permit a total 14 day detention time of wastewater within pond 202. Hydraulic baffle 210 splits pond 202 so that the wastewater is detained in cell 206 for 7 days and detained in cell 208 for 7 days. The incoming influent has 250 mg/L BOD and 250 mg/L TSS.

Second pond 204 is 0.66 acres, 8 feet deep and constructed/regulated to cause a total 8 day detention of wastewater. Second pond 204 includes main cell 214 and polishing/rock filter 216 and baffle 218 for separating main cell 214 and filter 216. The wastewater is detained in main cell 214 for 7 days and then detained in filter 216 for 1 day.

At 150,000 gallons of effluent flow per day with effluent limits of 30 mg/T BOD AND 30 MG/L tss, this system is already hydraulically overloaded. It is desired to double the capacity of the system to 300,000 gallon per day. In addition, more stringent effluent limits of 10 mg/L BOD, 15 mg/L TSS and 2 mg/L $NH_3$—N must be achieved.

With conventional technology, increasing this treatment facility's capacity would require building an additional pond or new system. However, with the system of the present invention, the new desired capacity of 300,000 gallon per day and more stringent effluent limits are met without building an additional pond system. Specifically, the conventional system 200 is converted into system 10 with the following steps. When the conversion is finished, the system will have the features and attributes shown in FIGS. 1–3. First, conventional hydraulic baffle is removed from first pond 202 and is replaced with a hydraulic baffle like baffle 42 (see FIGS. 1 and 2). As shown in FIG. 1, the new baffle 42 is placed to divided the first pond so that the first cell 30 is slightly smaller than second cell 32. Second, an air diffusion system 40 and mixers 38 are installed in cells 30 and 32 of first pond 12 and cover system 36 is added to completely cover first pond 12. Mixers 38 preferably have a capacity of 3 HP in first cell 30 and a capacity of 5 HP in second cell 32 to permit more aggressive intermittent mixing in second cell 32. In addition, any diffusion or mixing system in conventional second pond 204 is removed to convert that pond into a quiescent settling cell 43. Cover system 36B is added to completely cover second pond 204. In addition, rock/polishing filter 216 is removed or isolated so that it is inactive and not part of the wastewater treatment system. Finally, polishing reactor 16 is added as a new structure or formed as an isolated portion of second pond 204 by using a baffle to separate the polishing reactor from the anaerobic reactor cell in the second pond 204 (e.g., polishing reactor 16 is substituted for rock/polishing filter 216).

The completed conversion of the conventional system 200 is shown in FIG. 1. With the system 10 of the present invention in place, wastewater is detained for 7 days in first pond 12 including 3 days in first cell and for 4 days in second cell. The wastewater is then detained for 4 days in second pond 14. This converted system now handles 300,000 gallons per day without increasing the footprint of the system and achieves more stringent effluent limits of 10 mg/L BOD, 15 mg/L TSS, and 2 mg/L $NH_3$—N after exiting polishing reactor 16.

In some instances of retrofitting a conventional lagoon system, the original ponds are larger than necessary for use as a treatment pond in the treatment system of the present invention. In these instances, a first step of the retrofit conversion includes isolating one or more of the original lagoon ponds so that only a portion (e.g., one-half) of their original size is used as treatment ponds in the system of the present invention. The remainder of the original lagoon ponds remain idle (i.e., are not part of the system) and are reserved for use as an additional covered pond to meet future increased capacity.

EXAMPLES 2 and 3

New Treatment System Construction

In another example, system 10 can be built as a new system as shown to treat 750,000 gallons per day and meet stringent effluent limits of 10 mg/L BOD, 15 mg/L TSS and 2 mg/L $NH_3$—N. In this instance, as seen in FIG. 1, first pond 12 covers 1.73 acres and is 12 feet deep, and second pond 14 covers 1.26 acres and is 12 feet deep. Mixers 38 have a capacity of 7.5 BP. With this system, wastewater is detained in complete mix aerobic cell 30 for 3 days and detained in partial mix aerobic cell 32 for 3 days and finally detained in quiescent anaerobic cell 43 for 3 days. This process converts influent at 250 mg/L BOD, 250 mg/L TSS, and 30 $NH_3$—N to a clarified effluent at 10 mg/L BOD, 15 mg/L TSS, and 2 $NH_3$—N.

In another example, system 10 can be built as a new system as shown in FIG. 1 to treat 2 million gallons per day and meet stringent effluent limits of 10 mg/L BOD, 15 mg/L TSS and 2 mg/L $NH_3$—N. In this instance, the first pond 12 covers 4.12 acres and is 12 feet deep, and the second pond 14 covers 2.4 acres and is 12 feet deep. Complete mix cell 30 is 2.06 acres while partial mix cell is 2.06 acres. While cells 30, 32, and 43 can have many shapes, a square shape is preferred. With this system, wastewater is detained in complete mix aerobic cell 30 for 3 days and detained in partial mix aerobic cell 32 for 3 days and finally detained in quiescent anaerobic cell 43 for 4 days. This process converts influent at 250 mg/L BOD, 250 mg/L TSS, and 30 $NH_3$ to clarified effluent at 10 mg/L BOD, 15 mg/L TSS, and 2 mg/L $NH_3$—N.

Figure 5:
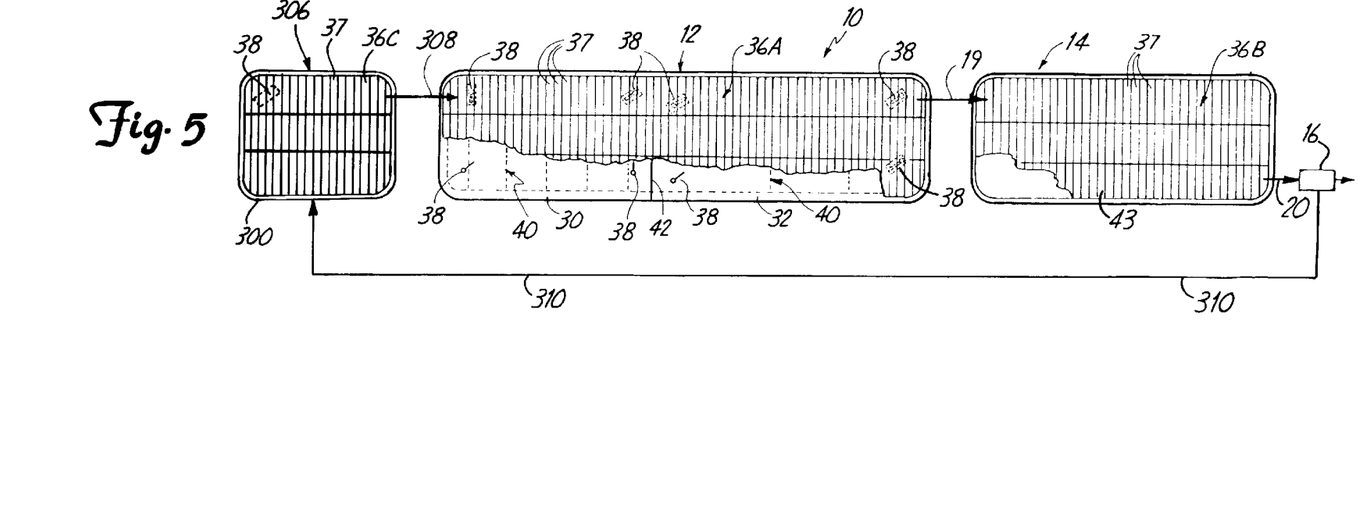
FIG. 5 is a plan view of an alternate embodiment of the system of the present invention including an anoxic cell and recirculation loop.

In an alternative embodiment, the system of the present invention further includes the addition of a completely covered anoxic reactor cell 300 as shown in FIG. 5 The anoxic reactor cell is constructed similar to aerobic cells 30 and 32 in general appearance as part of a lagoon and includes at least one mixer 302, does not include any aeration devices, and includes a cover system 36C (like cover system 36A) for covering the anoxic reactor cell. The anoxic reactor cell is operated as a complete mix cell in a manner known to those skilled in the art. The anoxic cell 300 is located prior to the complete mix aerobic cell 30 in the system 10 so that the influent intake port 308 of the complete mix aerobic reactor cell 30 acts as a discharge port of the anoxic reactor cell 300 for discharging partially treated wastewater from the anoxic cell 300 into the complete mix aerobic reactor cell 30. In other words, untreated influent 306 first flows into and is treated by the anoxic cell 300 and then the anoxic cell 300 discharges the partially treated wastewater into the complete mix aerobic reactor cell 30 as influent 308.

The anoxic reactor cell 300 is preferably used to attain near total nitrogen removal from the wastewater. This process is accomplished by directing a portion of the effluent exiting the polishing reactor 16, which is high in nitrites, through recirculation loop 310 into the anoxic reactor cell 300 for mixing with the untreated wastewater. Since the anoxic reactor cell 300 lacks any molecular oxygen (as would be available with aeration, which is not present), the untreated wastewater seeks the oxygen in the nitrites, which thereby reduces biochemical oxygen demand and releasing the freed nitrogen into the atmosphere. According, this step both reduces BOD in the anoxic cell 300 and reduces the nitrogen in the cell. This latter step that occurs in the anoxic reactor cell 300 is called denitrification, which occurs at the higher water temperature.

In addition, the system of the present invention optionally includes additional components to heighten biological activity of the treatment. For example, submerged attached growth media (which are known to those skilled in the art) can be added into the complete mix aerobic cell 30 to enhance biological treatment activity. Moreover, one or more of the complete mix anoxic cell 300, the complete mix aerobic cell 30, the partial mix aerobic cell 32 and the quiescent anaerobic cell 43 can include submerged attached growth media to enhance biological treatment activity.

Figure 6:
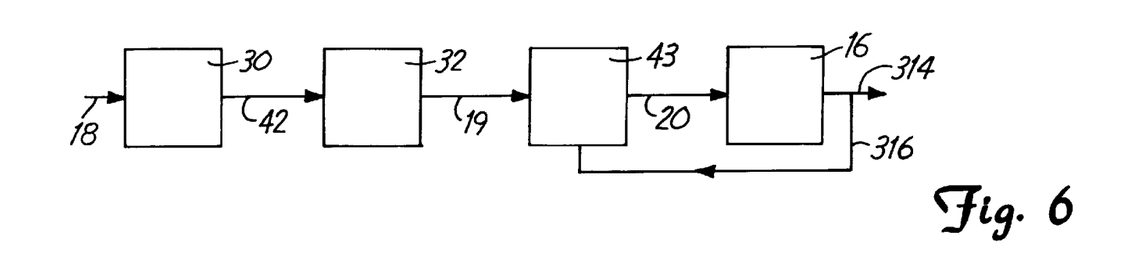
FIG. 6 is a block diagram of an alternative embodiment of the inventive system showing wastewater flow (and recirculation to a quiescent anaerobic cell), wherein the system utilizes growth media with a polishing reactor.
Figure 7:
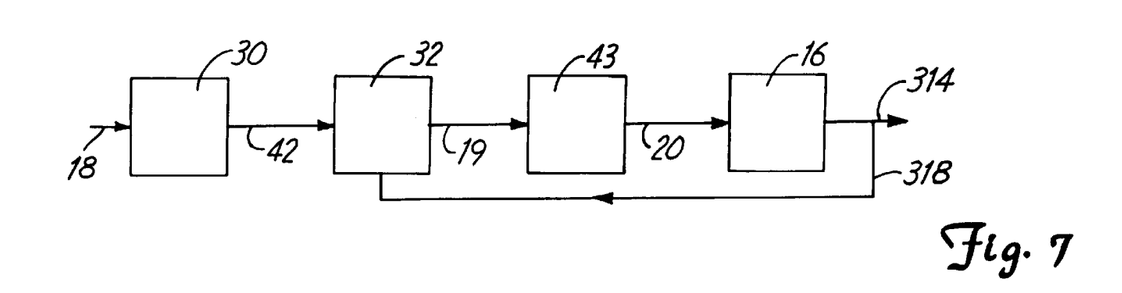
FIG. 7 is a block diagram of an alternative embodiment of the inventive system showing wastewater flow (and recirculation to a partial mix aerobic cell), wherein the system utilizes growth media with a polishing reactor.
Figure 8:
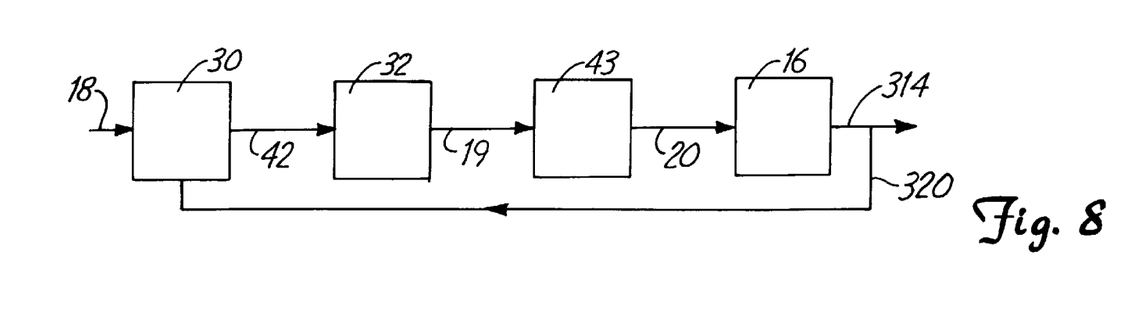
FIG. 8 is a block diagram of an alternative embodiment of the inventive system showing wastewater flow (and recirculation to a complete mix aerobic cell), wherein the system utilizes growth media with a polishing reactor.

The use of growth media in the covered reactor cells facilitates additional alternate embodiments of the system, such as those shown in FIGS. 6–8. A portion of the flow of water is redirected from the discharge of the polishing reactor 16 back into one of the previous reactor cells. As shown in FIG. 6, polishing reactor discharge 314 is split and a portion is drawn off and recirculated through a quiescent anaerobic cell loop 316, and subsequently discharged into the quiescent anaerobic cell 43. Alternatively, water is redirected through a partial mix cell loop 318 (shown in FIG. 7) and discharged into the partial mix aerobic cell 32, or directed through a complete mix cell loop 320 (shown in FIG. 8) and discharged into the complete mix aerobic cell 30.

Figure 9:
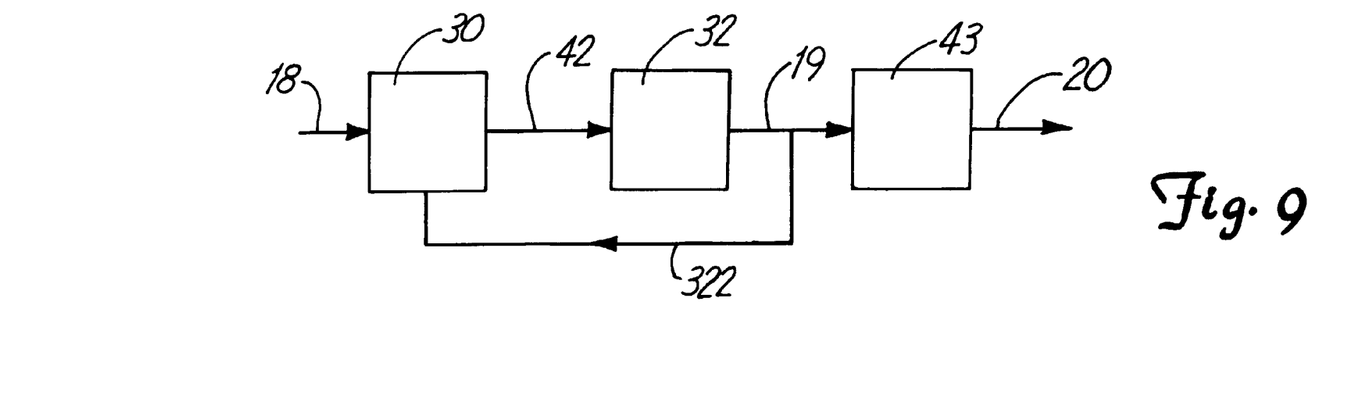
FIG. 9 is a block diagram of an alternative embodiment of the inventive system showing wastewater flow (and recirculation to a complete mix aerobic cell) wherein the system utilizes growth media without a polishing reactor.
Figure 10:
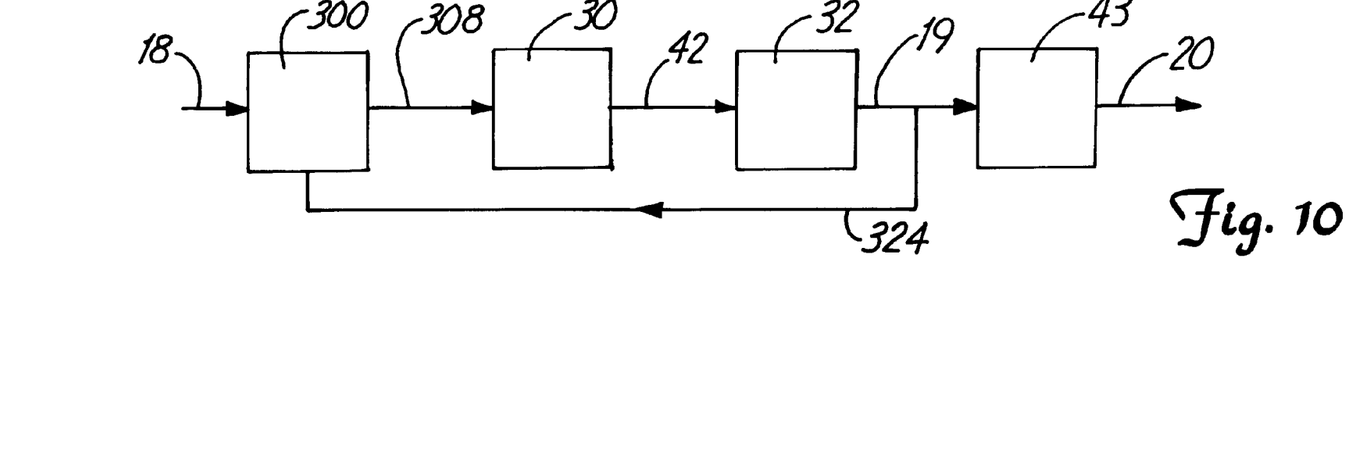
FIG. 10 is a block diagram of an alternative embodiment of the inventive system showing wastewater flow (and recirculation to a complete mix anoxic cell) wherein the system utilizes growth media without a polishing reactor.

It is not necessary to have the polishing reactor 16 in order to use suspended growth media in conjunction with water recirculation loops. As shown in FIGS. 9 and 10 the intermediate effluent 19 discharged from the partial mix cell 32 is split. A portion of that effluent 19 is recirculated through either a second complete mix cell loop 322 (FIG. 9) and discharged into the complete mix cell 30, or alternatively through an anoxic cell loop 324 (FIG. 10) and discharged into the anoxic cell 300.

Figure 11:
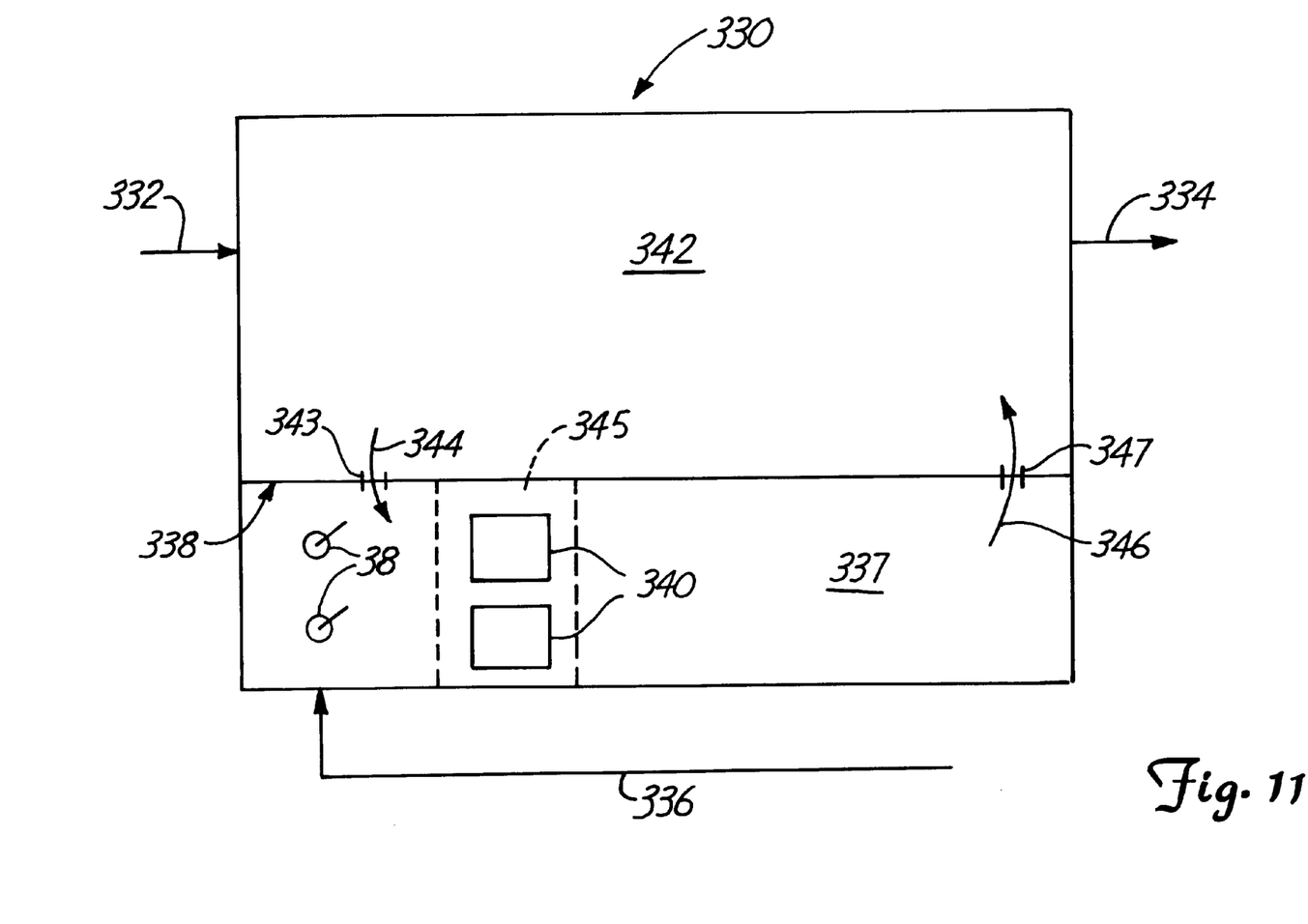
FIG. 11 shows a block diagram of a growth media reactor cell.

FIG. 11 shows a block diagram of a covered growth media reactor cell 330. The growth media reactor cell 330 is a generic representation of any of the above mentioned covered reactor cells which have recirculation loops that receive water from downstream in the system, including the anoxic reactor cell 300, the complete mix aerobic cell 30, the partial mix aerobic cell 32, and the quiescent anaerobic cell 43.

The growth media reactor cell 330 includes wastewater inflow 332 and wastewater outflow 334. Recirculation pipe 336 is directed into the growth media reactor cell 330 into a denitrification section 337 of the growth media reactor cell 330, which is separated from the rest of the cell by the use of a baffle 338 similar to the hydraulic baffle 42 discussed earlier. The denitrification section 337 of the growth media reactor cell 330 contains one or more mixers 38 and growth media 340. Mixers 38 are used to draw wastewater from a main section 342 of the growth media reactor cell 330 through an inlet 343 in the baffle 338 along mixing path 344. This wastewater mixes with the water received from the recirculation pipe 336 in the denitrification section 337. The mixed water column passes through a zone 345 of the submerged growth media 340 and is then returned to the main section 342 through an outlet 347 in the baffle 338 along denitrification path 346. The water then continues to the next step in the process through the outflow 334.

The growth media 340 provides surface area on which denitrification bacteria can grow. When nitrates and nitrites are introduced via the water in flow from recirculation pipe 336, under proper process conditions known to those skilled in the art, the bacteria operates to remove oxygen from the nitrates and nitrites and molecular nitrogen is released as a free gas into the atmosphere.

Conclusion

The wastewater treatment system of the present invention has numerous advantages. This system dramatically reduces wastewater treatment times and increases system capacity through several effects. First, the cover eliminates algae production by blocking sunlight and reduces odor migration from the ponds. Second, the cover provides insulation from ambient air conditions (e.g., freezing temperatures) to permit the reactor cells to operate at higher temperatures year round. Higher water temperatures are conducive to nitrification and heightened biological activity of the aerobic and anaerobic treatment bacteria. Third, the system permits increased treatment capacity (e.g., doubled capacity) without increasing the number or size of the treatment ponds. This latter feature is significant since an additional treatment pond need not be built to increase treatment capacity. Alternatively, if a new system is being constructed, a high capacity treatment system can be built on the same footprint of a conventional system. In other words, the system greatly reduces the pond footprint required to treat a given volume of wastewater. Fourth, by covering the process including the aerobic and anaerobic treatment cells, the polishing reactor will reduce ammonia regardless of ambient air temperature. Fifth, the combination of the covered aerobic mixing cells and covered anaerobic settling zone prevents solids build up in the aerobic cells through treatment and mixing, which keeps the remaining solids suspended, and more nearly balances a rate of growth and decay in the anaerobic zone to reduce sludge build up and confine it to the anaerobic settling zone. Sixth, by adding growth media to the reactor cells, the levels of nitrates and nitrites can be reduced from the water column. Finally, the polishing reactor insures reduction of residual biochemical oxygen demand (BOD), total suspended solids (TSS) and nitrification of excess ammonia-nitrogen ($NH_3$—N) to meet the most stringent effluent limits.

Although the present invention has been described with reference to preferred embodiments, workers skilled in the art will recognize that changes may be made in form and detail without departing from the spirit and scope of the invention. For example, the benefits of a covered system as described herein can still be substantially achieved by substantially covering the aerobic and anaerobic treatment cells instead of completely covering those cells.

What is claimed is:

1. A lagoon based apparatus for treating wastewater comprising:
   a first treatment lagoon defining:
      at least one complete mix first aerobic reactor cell including at least one an aeration device, and an influent intake port;
      a partial mix second aerobic reactor cell including at least one aeration device and at least one mixing system, the second reactor cell being in communication with the complete mix aerobic reactor cell to receive effluent from the first cell;
   a second treatment lagoon defining a quiescent anaerobic reactor cell in communication with the partial mix aerobic reactor cell to receive effluent from the partial mix aerobic cell, and including an effluent discharge port;
   a first cover covering the complete mix reactor cell;
   a second cover covering the partial mix reactor cell; and
   a third cover covering the anaerobic reactor cell.

2. The apparatus of claim 1 and further comprising:
   an anoxic reactor cell including at least one mixer and a second influent intake port;
   a fourth cover covering the anoxic reactor cell;
   wherein the influent intake port of the complete mix aerobic reactor cell acts as a discharge port of the anoxic reactor cell for discharging partially treated wastewater from the anoxic cell into the complete mix aerobic reactor cell.

3. The apparatus of claim 2 wherein the anoxic reactor cell further comprises submerged attached growth media to enhance biological activity.

4. The apparatus of claim 2 further comprising:
   a polishing reactor in communication with the anaerobic reactor cell to receive effluent from the anaerobic reactor cell, the polishing reactor including a final effluent discharge port,
   a recirculation loop directing a portion of the effluent from the final effluent discharge port to at least one of the anoxic reactor cell, the complete mix aerobic reactor cell, the partial mix aerobic reactor cell, or the quiescent anaerobic reactor cell.

5. The apparatus of claim 4 wherein each reactor cell which receives effluent from the recirculation loop further comprises:
   submerged growth media that provides surface area on which denitrification bacteria can grow.

6. The apparatus of claim 2, and further comprising:
   a recirculation loop directing effluent discharged from the partial mix aerobic reactor cell to the anoxic reactor cell; and
   submerged attached growth media in the anoxic reactor cell that provides surface area to achieve denitrification.

7. The apparatus of claim 1 wherein the complete mix reactor cell further comprises a mixing system including at least one mixer.

8. The apparatus of claim 1 wherein the mixing system of the partial mix aerobic reactor cell operates at a first rate of mixing and at least a portion of the mixing system of the partial mix aerobic reactor cell is capable of intermittent operation to intermittently mix the partial mix aerobic reactor cell at a second rate of mixing higher than the first rate of mixing.

9. The apparatus of claim 1 and further comprising a hydraulic baffle and a first pond wherein the first aerobic cell and the second aerobic cell are defined on opposite sides of the baffle within the first pond.

10. The apparatus of claim 1 and further comprising a third lagoon divided into lagoon sections, wherein one or more of the reactor cells are defined by separate lagoon sections of the third lagoon.

11. The apparatus of claim 10 wherein the third lagoon comprises:
    a retrofitted lagoon existing as part of a previous water treatment apparatus.

12. The apparatus of claim 1 wherein the first lagoon and the second lagoon comprise:
    at least one retrofitted lagoon existing as part of a previous water treatment apparatus.

13. The apparatus of claim 1 wherein at least one of the complete mix aerobic reactor cell, the partial mix reactor cell, and the quiescent anaerobic reactor cell further comprises submerged attached growth media to enhance biological activity.

14. The apparatus of claim 13 wherein the submerged growth media provides surface area to achieve denitrification.

15. The apparatus of claim 1, and further comprising:
    a recirculation loop directing effluent discharged from the partial mix aerobic cell to the complete mix aerobic reactor cell; and
    submerged attached growth media in the complete mix aerobic reactor cell that provides surface area to achieve denitrification.

16. A method of treating wastewater in lagoons comprising:
    receiving an influent of wastewater into a complete mix covered aerobic reactor cell;
    detaining the wastewater in the complete mix covered aerobic reactor cell for a first predetermined amount of time while mixing and aerating the wastewater in an environment with sufficient mixing and aeration to achieve complete mix aerobic treatment, wherein the cover maintains the temperature of the wastewater in the complete mix reactor cell at substantially the same temperature of the influent wastewater, thereby maximizing the kinetics of the aerobic treatment process;
    transferring the wastewater from the complete mix covered aerobic reactor cell to a partial mix covered aerobic reactor cell after the first predetermined amount of time;
    detaining the wastewater in the partial mix covered aerobic reactor cell for a second predetermined amount of time while aerating the wastewater and while mixing the wastewater to maintain a treatment environment to achieve partial mix aerobic treatment, wherein the cover maintains the temperature of the wastewater in the partial mix reactor cell at substantially the same temperature of the wastewater in the complete mix reactor cell, thereby maximizing the kinetics of the aerobic treatment process, and wherein the wastewater is intermittently mixed at an intensity to achieve a temporary complete mix treatment environment and with sufficient frequency to resuspend settled solids in the wastewater for transferring the solids out of the partial mix aerobic reactor cell with the wastewater;

transferring the wastewater from the partial mix covered aerobic reactor cell to a covered anaerobic reactor cell after the second predetermined amount of time;

detaining the wastewater in the covered anaerobic reactor cell for a third predetermined amount of time without aerating and without mixing the wastewater and wherein the cover maintains a temperature of the wastewater in the covered anaerobic cell at substantially the same temperature as the temperature of the wastewater in the partial mix reactor cell, thereby maximizing the kinetics of the anaerobic treatment process; and discharging an effluent of treated wastewater from the anaerobic reactor cell.

17. The method of claim 16 wherein the receiving step further comprises:

receiving the influent wastewater into a complete mix covered, anoxic cell prior to being received into the complete mix aerobic reactor cell;

detaining the wastewater in the complete mix covered anoxic reactor cell for a fourth predetermined amount of time while mixing the wastewater;

accepting a fraction of the wastewater which has been discharged from the anaerobic reactor cell into the complete mix covered anoxic cell;

attaining denitrification in the anoxic reactor cell the temperature maintained by the covered aerobic and anaerobic reactor cells.

18. A The method of claim 17 wherein the complete mix anoxic cell further comprises submerged attached growth media to enhance biological activity.

19. The method of claim 17 additionally comprising:

transferring a portion of the wastewater from the partial mix covered aerobic reactor cell to the anoxic reactor cell; and providing submerged attached growth media in the anoxic reactor cell that provides surface area to achieve denitrification.

20. The method of claim 11 wherein at least one of the complete mix aerobic reactor cell, the partial mix reactor cell, and the quiescent anaerobic reactor cell further comprises submerged attached growth media to enhance biological activity.

21. The method of claim 16 wherein the complete mix covered aerobic reactor cell, the partial mix covered aerobic reactor cell and the covered anaerobic reactor cell are located in at least one preexisting lagoon.

22. The method of claim 21 where the preexisting lagoon was uncovered in the previously existing wastewater treatment apparatus.

23. The method of claim 16 additionally comprising:

transferring a portion of the wastewater from the partial mix aerobic reactor cell to the complete mix reactor cell; and providing submerged attached growth media in the complete mix reactor cell that provides surface area to achieve denitrification.

24. The method of claim 16 additionally comprising:

transferring the wastewater from the covered anaerobic reactor cell to a polishing reactor after the third predetermined amount of time;

detaining the wastewater in the polishing reactor cell for a fifth predetermined amount of time, which is less than the first predetermined amount of time, and attaining attached growth biological kinetics at a reaction rate commensurate with the elevated water temperature maintained by the covered aerobic and anaerobic reactor cells and providing sufficient reaction surface in the polishing reactor to achieve nitrification at the elevated water temperature regardless of ambient air temperature;

discharging an effluent of treated wastewater from the polishing reactor;

transferring part of the treated wastewater from the polishing reactor to at least one of the complete mix aerobic reactor cell, the partial mix aerobic reactor cell, and the anaerobic reactor cell, wherein each reactor cell which receives treated effluent from the polishing reactor has submerged attached growth media therein that provides surface area to achieve denitrification.

25. A method of converting an existing wastewater treatment lagoon system comprises:

isolating a portion of a first existing treatment pond to serve as a complete mix aerobic reactor cell;

isolating a portion of the first existing treatment pond or a second existing treatment pond to serve as a partial mix aerobic reactor cell;

isolating a portion of the first existing treatment pond, the second existing treatment pond or a third existing treatment pond to serve as an anaerobic reactor cell;

covering the complete mix aerobic reactor cell with a cover sufficient to maintain the temperature of wastewater detained therein for a first predetermined amount of time, while mixing and aerating the wastewater sufficiently to achieve complete mix aerobic treatment, at substantially the same temperature as when the wastewater is introduced into the complete mix aerobic reactor cell to maximize the kinetics of the aerobic treatment process;

covering the partial mix aerobic reactor cell with a cover sufficient to maintain the temperature of wastewater detained therein for a second predetermined amount of time, while aerating and while mixing the wastewater to achieve partial mix aerobic treatment and while intermittently mixing the wastewater at an intensity to achieve a temporary complete mix treatment and with sufficient frequency to resuspend settled solids in the wastewater for transferring the solids out of the partial mix aerobic reactor cell with wastewater discharged therefrom at substantially the same temperature as the wastewater in the complete mix aerobic reactor cell to maximize the kinetics of the aerobic treatment process; and covering the anaerobic reactor cell with a cover sufficient to maintain the temperature of wastewater detained therein for a third predetermined amount of time, while not aerating or mixing the wastewater, at substantially the same temperature as the wastewater in the partial mix aerobic cell to maximize the kinetics of the anaerobic treatment process.

26. The method of claim 25, and further comprising:

providing a polishing reactor for detaining wastewater therein for a fourth predetermined amount of time, which is less than the first predetermined amount of time, and attaining attached growth biological kinetics at a reaction rate commensurate with the elevated wastewater temperature maintained by the covered aerobic and anaerobic reactor cells and providing sufficient reaction surface in the polishing reactor to achieve nitrification at the elevated wastewater temperature regardless of ambient air temperature.

27. The method of claim 26, and further comprising:

isolating a portion of the first existing treatment pond, the second existing treatment pond, the third existing treatment pond or a fourth existing treatment pond to serve as a complete mix anoxic reactor cell;

covering the complete mix anoxic reactor cell with a cover sufficient to maintain the temperature of wastewater detained therein for a fifth predetermined amount of time, while mixing the wastewater therein with a fraction of the wastewater discharged from the polishing reactor, at the elevated wastewater temperature to attain denitrification.

28. The method of claim 27 further comprising:

transferring a portion of water discharged from the polishing reactor through a recirculation loop to at least one of the complete mix aerobic reactor cell, the partial mix aerobic reactor cell and the anaerobic reactor cell, wherein each reactor cell which receives water discharged from the polishing reactor has submerged attached growth media therein that provides surface area to achieve denitrification.

29. The method of claim 25 further comprising:

transferring a portion of the wastewater discharged from the partial mix aerobic reactor cell through a recirculation loop to the complete mix aerobic reactor cell;

providing submerged attached growth media in the complete mix aerobic reactor cell that provides surface area to achieve denitrification.

30. The method of claim 25 further comprising:

isolating a portion of the first existing treatment pond, the second existing treatment pond, the third existing treatment pond or a fourth existing treatment pond to serve as a complete mix anoxic reactor cell; and covering the complete mix anoxic reactor cell with a cover sufficient to maintain the temperature of wastewater detained therein for a fourth predetermined amount of time;

transferring a portion of the wastewater discharged from the partial mix aerobic reactor cell through a recirculation loop to the complete mix anoxic reactor cell;

providing submerged attached growth media in the complete mix anoxic reactor cell that provides surface area to achieve denitrification.

* * * * *

UNITED STATES PATENT AND TRADEMARK OFFICE
CERTIFICATE OF CORRECTION

PATENT NO.    : 6,136,194
DATED         : October 24, 2000
INVENTOR(S)   : Steven M. Vogel Page 1 of 1

It is certified that error appears in the above-identified patent and that said Letters Patent is hereby corrected as shown below:

<u>Column 13,</u>
Line 32, delete "A"

Signed and Sealed this

Thirteenth Day of November, 2001

*Attest:*

*Attesting Officer*

NICHOLAS P. GODICI
*Acting Director of the United States Patent and Trademark Office*